United States Patent
Nakayama

(10) Patent No.: US 8,958,842 B2
(45) Date of Patent: Feb. 17, 2015

(54) RADIO COMMUNICATION SYSTEM, HIGH-POWER BASE STATION, LOW-POWER BASE STATION, RADIO TERMINAL, AND RADIO COMMUNICATION METHOD

(75) Inventor: Taku Nakayama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 352 days.

(21) Appl. No.: 13/505,720

(22) PCT Filed: Nov. 1, 2010

(86) PCT No.: PCT/JP2010/069451
§ 371 (c)(1),
(2), (4) Date: May 2, 2012

(87) PCT Pub. No.: WO2011/052773
PCT Pub. Date: May 5, 2011

(65) Prior Publication Data
US 2012/0220332 A1    Aug. 30, 2012

(30) Foreign Application Priority Data
Nov. 2, 2009   (JP) .................. 2009-251668

(51) Int. Cl.
*H04B 7/00* (2006.01)
*H04W 48/20* (2009.01)
(Continued)

(52) U.S. Cl.
CPC .............. *H04W 48/20* (2013.01); *H04W 28/08* (2013.01); *H04W 36/08* (2013.01); *H04W 36/30* (2013.01); *H04W 88/08* (2013.01)
USPC ........... 455/524; 455/449; 455/443; 455/444; 370/332

(58) Field of Classification Search
CPC ..... H04W 28/08; H04W 36/08; H04W 36/30; H04W 48/20; H04W 88/08
See application file for complete search history.

(56) References Cited

U.S. PATENT DOCUMENTS 8,346,258 B2    1/2013  Kitaji
8,599,880 B1 *  12/2013 Srinivas et al. ............... 370/491
(Continued)

FOREIGN PATENT DOCUMENTS

| CN | 1972502 A | 5/2007 |
| CN | 1998258 A | 7/2007 |

(Continued)

OTHER PUBLICATIONS

An Office Action; "Notice of Reasons for Rejection," issued by the Japanese Patent Office on Aug. 20, 2013, which corresponds to Japanese Patent Application No. 2011-538519 and is related to U.S. Appl. No. 13/505,720; with statement of relevance.
(Continued)

*Primary Examiner* — Fayyaz Alam
*Assistant Examiner* — Mohammed Rachedine
(74) *Attorney, Agent, or Firm* — Studebaker & Brackett PC

(57) ABSTRACT

When the received power level of the low-power PDCCH control information from a low-power base station (200) received by a radio terminal (300) is at a prescribed level or more, a high-power base station (100) removes the high-power base station (100) as the connection destination candidate of the radio terminal (300) regardless of the received power level of the high-power PDCCH control information from the high-power base station (100), and performs handover processing so that the connection destination of the radio terminal (300) switches from the high-power base station (100) to the low-power base station (200) which has become the connection destination candidate.

9 Claims, 10 Drawing Sheets

(51) Int. Cl.
*H04W 28/08* (2009.01)
*H04W 36/08* (2009.01)
*H04W 36/30* (2009.01)
*H04W 88/08* (2009.01)

(56) References Cited

U.S. PATENT DOCUMENTS

| | | |
|---|---|---|
| 2009/0016278 A1 | 1/2009 | Wakabayashi |
| 2010/0027510 A1* | 2/2010 | Balasubramanian et al. ... 370/332 |
| 2010/0113030 A1 | 5/2010 | Kanazawa et al. |
| 2010/0173632 A1 | 7/2010 | Kitaji |
| 2011/0090859 A1 | 4/2011 | Wakabayashi |

FOREIGN PATENT DOCUMENTS

| | | | |
|---|---|---|---|
| CN | 101018387 A | | 8/2007 |
| JP | 10-248090 | | 9/1998 |
| JP | 10249090 A | * | 9/1998 |
| JP | 2005-223447 A | | 8/2005 |
| JP | 2005223447 A | * | 8/2005 |
| JP | 2006-101442 A | | 4/2006 |
| JP | 2009-147531 A | | 7/2009 |
| JP | 2009-246598 A | | 10/2009 |
| WO | 2008/129812 A1 | | 10/2008 |
| WO | 2008/146889 A1 | | 12/2008 |

OTHER PUBLICATIONS

3GPP TSG-RAN WG1 #58; Kyocera; "Uplink performance evaluation in heterogeneous deployment"; R1-093433; Shenzhen, P.R. China; Aug. 24-28, 2009.
3GPP TSG-RAN WG1 #59; Kyocera; "Technical Aspects of Heterogeneous Networks"; R1-094775; Jeju, Korea; Nov. 9-13, 2009.
3GPP TSG-RAN WG1 #59; Kyocera; "Downlink Performance Evaluation in Heterogeneous Deployment Configurations 1 and 4"; R1-094777; Jeju, Korea; Nov. 9-13, 2009.
3GPP TSG-RAN WG1 #58bis; Kyocera; "Uplink and PDCCH performance evaluation in heterogeneous deployment configurations 1 and 4"; R1-093856; Miyazaki, Japan; Oct. 12-16, 2009.
International Search Report; PCT/JP2010/069451; Dec. 7, 2010.
The first Office Action issued by the Chinese Patent Office on Mar. 4, 2014, which corresponds to Chinese Patent Application No. 201080048548.3 and is related to U.S. Appl. No. 13/505,720; with English language concise explanation.

* cited by examiner

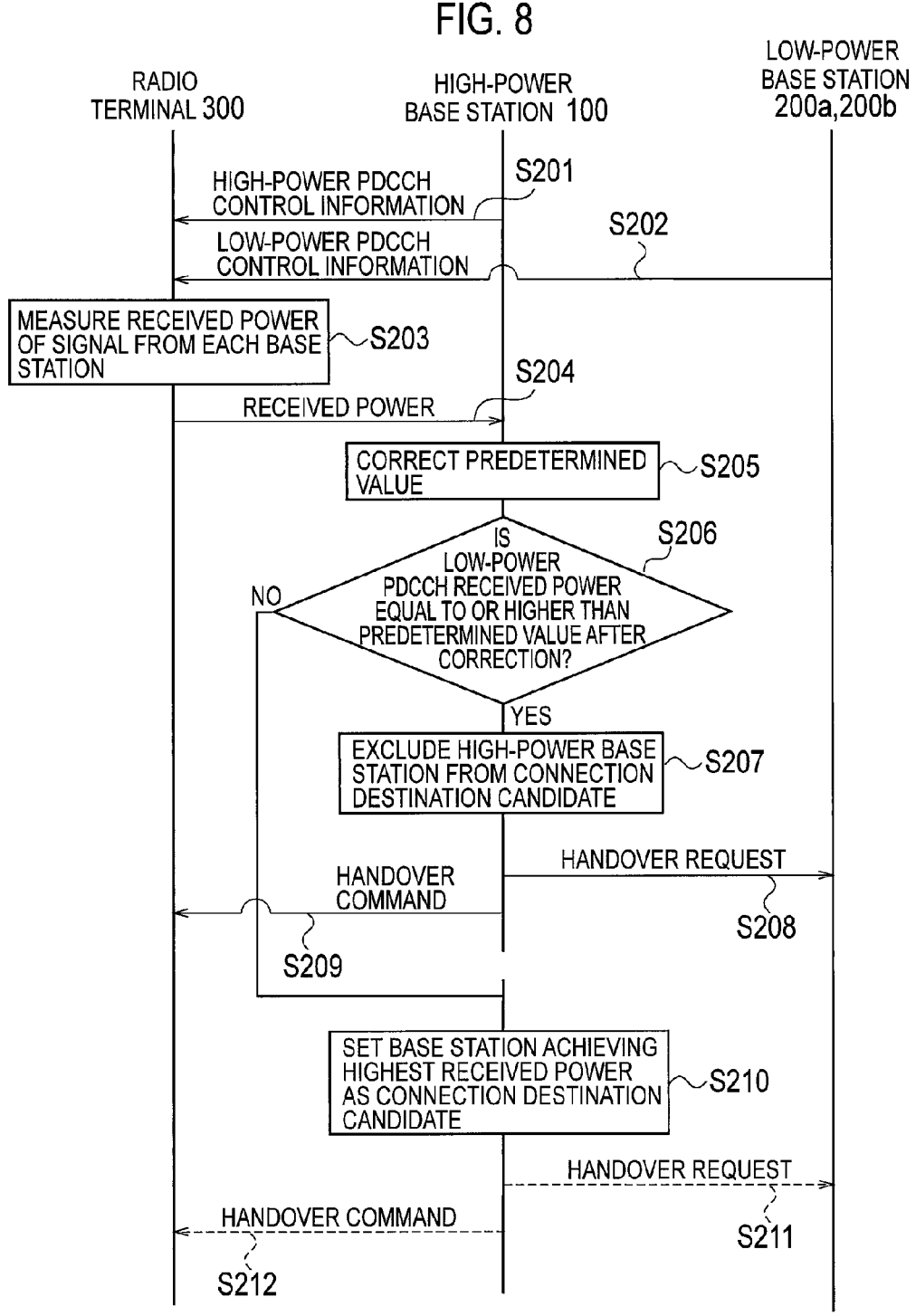

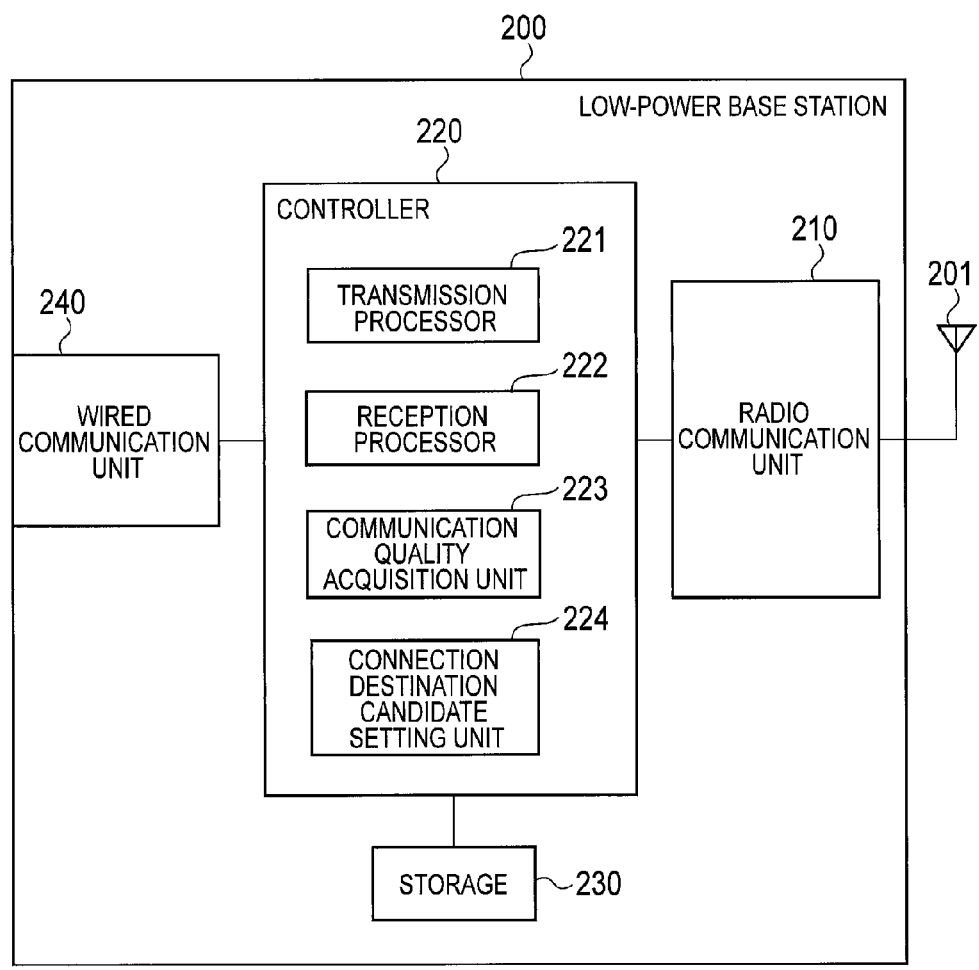

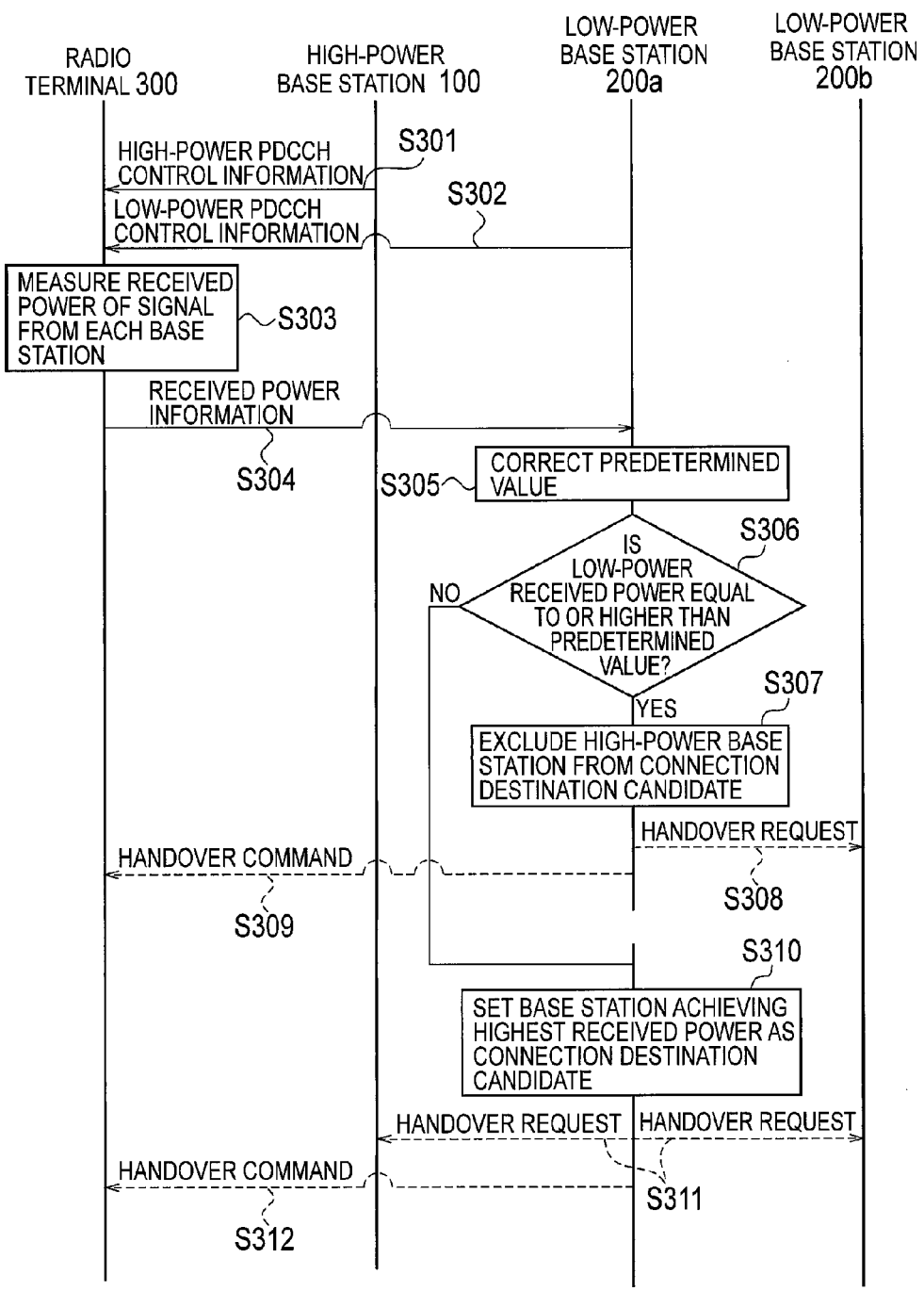

RADIO COMMUNICATION SYSTEM, HIGH-POWER BASE STATION, LOW-POWER BASE STATION, RADIO TERMINAL, AND RADIO COMMUNICATION METHOD

TECHNICAL FIELD

The present invention relates to a radio communication system including a high-power base station, a low-power base station having a lower transmission power than the high-power base station, and a radio terminal located within a communication area covered by the high-power base station, and relates to the high-power base station, the low-power base station and the radio terminal in the radio communication system, and a radio communication method in the radio communication system.

BACKGROUND ART

A conventional cellular radio communication system achieves area coverage of a wide service area by dividing the wide service area into communication area units called cells, and allocating a base station to each communication area, the base station taking charge of radio communications with radio terminals within the communication area. As such a base station, used is a high-power base station (so-called a macrocell base station) having a high transmission power.

In recent years, attention have been paid to low-power base stations (so-called a picocell base station or a femtocell base station) having a lower transmission power than high-power base stations. When a low-power base station is installed in the cell of a high-power base station, the load of the high-power base station can be distributed to the low-power base station. Incidentally, a radio communication environment using a high-power base station and a low-power base station together is referred to as a heterogeneous deployment (see, for example, non-patent literature 1).

CITATION LIST

Non-Patent Literature

Non-patent literature 1: 3GPP R1-093433 "Uplink performance evaluation in heterogeneous deployment"

SUMMARY OF THE INVENTION

However, in the heterogeneous deployment, there is a case where a low-power base station is installed near a high-power base station, for example. In this case, even though a radio terminal exists near the low-power base station, received power or SINR (Signal to Interference and Noise Ratio) of a signal from the high-power base station in the ratio terminal sometimes becomes higher than received power or SINR of a signal from the low-power base station therein. As a result, the high-power base station is selected as a connection destination of the radio terminal. In other words, a communication area of the low-power base station is narrowed, and effects of the load balancing cannot be obtained even though the low-power base station is installed.

Against the above background, it is an objective of the present invention to provide a radio communication system, a high-power base station, a low-power base station, a radio terminal, and a radio communication method which are capable of proper distribution of a load of the high-power base station.

The present invention has the following features to solve the problems described above. A first feature of the present invention is summarized as follows. A radio communication system (radio communication system 1) comprises: a high-power base station (high-power base station 100); a low-power base station (low-power base station 200) whose transmission power is lower than a transmission power of the high-power base station; and a radio terminal (radio terminal 300) located within a communication area formed by the high-power base station, wherein the radio communication system comprises a connection destination candidate setting unit (connection destination candidate setting unit 124, connection destination candidate setting unit 224, connection destination candidate setting unit 323) configured to exclude the high-power base station from a connection destination candidate for the radio terminal when a communication quality between the radio terminal and the low-power base station is equal to or higher than a predetermined value.

When the communication quality between the radio terminal and the low-power base station is equal to or higher than the predetermined value, the radio communication system excludes the high-power base station from a connection destination candidate for the radio terminal regardless of the communication quality with the high-power base station. Accordingly, when the communication quality between the radio terminal and the low-power base station is equal to or higher than the predetermined value, the radio terminal comes to be connected to the low-power base station. Thus, the load of the high-power base station can be properly distributed.

A second feature of the present invention is summarized as follows. The connection destination candidate setting unit sets any of the high-power base station and the low-power base station having the highest communication quality as a connection destination candidate when the communication quality between the radio terminal and the low-power base station is below the predetermined value.

A third feature of the present invention is summarized as follows. The predetermined value is a communication quality allowing control information transmitted from the low-power base station to the radio terminal to have an error rate of a prescribed value.

A fourth feature of the present invention is summarized as follows. The predetermined value is a value which becomes higher as a utilization rate of a radio resource for control information in the high-power base station becomes higher.

A fifth feature of the present invention is summarized as follows. A high-power base station in a radio communication system having the high-power base station, a low-power base station whose transmission power is lower than a transmission power of the high-power base station, and a radio terminal located within a communication area formed by the high-power base station, the high-power base station comprises: a connection destination candidate setting unit configured to exclude the high-power base station from a connection destination candidate for the radio terminal when a communication quality between the radio terminal and the low-power base station is equal to or higher than a predetermined value.

A sixth feature of the present invention is summarized as follows. A low-power base station in a radio communication system having a high-power base station, the low-power base station whose transmission power is lower than a transmission power of the high-power base station, and a radio terminal located within a communication area formed by the high-power base station, the low-power base station comprises: a connection destination candidate setting unit configured to exclude the high-power base station from a connection destination candidate for the radio terminal when a communication quality between the radio terminal and the low-power base station is equal to or higher than a predetermined value.

A seventh feature of the present invention is summarized as follows. A radio terminal in a radio communication system having a high-power base station, a low-power base station whose transmission power is lower than a transmission power of the high-power base station, and the radio terminal located within a communication area formed by the high-power base station, the radio terminal comprises: a connection destination candidate setting unit configured to exclude the high-power base station from a connection destination candidate for the radio terminal when a communication quality between the radio terminal and the low-power base station is equal to or higher than a predetermined value.

An eighth feature of the present invention is summarized as follows. A radio communication method in a radio communication system having a high-power base station, a low-power base station whose transmission power is lower than a transmission power of the high-power base station, and a radio terminal located within a communication area formed by the high-power base station, the method comprises the step of: excluding the high-power base station by the high-power base station from a connection destination candidate for the radio terminal when a communication quality between the radio terminal and the low-power base station is equal to or higher than a predetermined value.

A ninth feature of the present invention is summarized as follows. A radio communication method in a radio communication system having a high-power base station, a low-power base station whose transmission power is lower than a transmission power of the high-power base station, and a radio located within a communication area formed by the high-power base station, the radio communication method comprises the step of: excluding the high-power base station by the low-power base station from a connection destination candidate for the radio terminal when a communication quality between the radio terminal and the low-power base station is equal to or higher than a predetermined value.

A tenth feature of the present invention is summarized as follows. A radio communication method in a radio communication system having a high-power base station, a low-power base station whose transmission power is lower than a transmission power of the high-power base station, and a radio terminal located within a communication area formed by the high-power base station, the radio communication method comprises the step of: excluding the high-power base station by the radio terminal from a connection destination candidate for the radio terminal when a communication quality between the radio terminal and the low-power base station is equal to or higher than a predetermined value.

The features of the present invention enable provision of a radio communication system, a high-power base station, a low-power base station, a radio terminal, and a radio communication method which are capable of proper distribution of the load of the high-power base station.

BRIEF DESCRIPTION OF THE DRAWINGS

FIG. 8 is an operational example of a radio communication system according to the second embodiment of the present invention.

FIG. 9 is a block diagram illustrating a configuration of a low-power base station according to the third embodiment of the present invention.

FIG. 10 is a sequence diagram illustrating an operational example of a radio communication system according to the third embodiment of the present invention.

DESCRIPTION OF THE EMBODIMENTS

Figure 1:
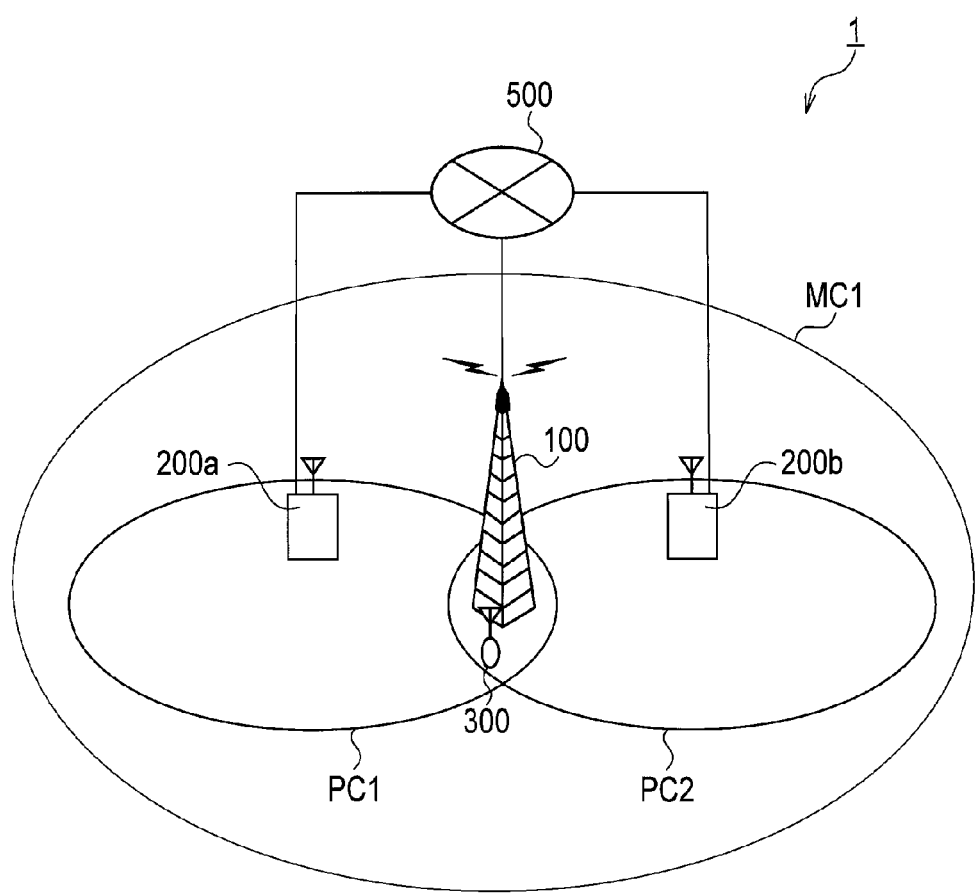
FIG. 1 is an entire schematic configuration diagram of a radio communication system according to an embodiment of the present invention.

Hereinafter, embodiments of the present invention are described by referring to the drawings. In the following description of the drawings, same or similar reference numerals are given to denote same or similar portions.

(Configuration of Radio Communication System)

FIG. 1 is an entire schematic configuration diagram of a radio communication system 1 according to an embodiment of the present invention. The radio communication system 1 has a configuration based on LTE Release 9 which is the 3.9th generation (3.9) mobile communication system or LTE-Advanced which is positioned as the 4th generation (4G) mobile communication system, for example.

As illustrated in FIG. 1, under a heterogeneous deployment, the radio communication system 1 has a high-power base station (a high-output-power base station, a large-output-power base station) (for example, a macrocell base station) 100 forming a large cell (for example, a macrocell) MC1, and a low-power base station (a low-output-power base station, and a small-output-power base station) (for example, a picocell base station) 200*a* and a low-power base station 200*b* which respectively form a small cell (for example, a picocell) PC1 and a small cell PC2. The picocell is also referred to as a hot zone. A radius of the large cell MC1 is on the order from 1 [km] to a several [km], for example, while each radius of the small cell PC1 and the small cell PC2 is on the order from a several dozens of [m] to 100 [m].

In the following description, the small cell PC1 and the small cell PC2 are simply referred to as "the small cell PC" when they are not distinguished from each other, and the low-power base station 200*a* and the low-power base station 200*b* are simply referred to as "the low-power base station 200" when they are not distinguished from each other.

The high-power base station 100 is installed in a place based on a cell site design made by a carrier in consideration of inter-cell interference. On the other hand, the low-power base station 200 is installed in the large cell MC1 for the purpose of distribution of a load of the high-power base station 100.

The high-power base station 100 is connected to a core network 500 via a dedicated line. Meanwhile, the low-power base station 200 is connected to the core network 500 via a dedicated line. However, the low-power base station 200 is sometimes connected to the core network via a general public network such as ADSL or FTTH.

(1) First Embodiment

Hereinafter, the description is given of configurations of a high-power base station, a low-power base station, and a radio terminal and an operation of a radio communication system in a first embodiment. In the first embodiment, at the time of initial connection such as a case where a radio terminal 300 is powered on, a connection destination candidate for the radio terminal 300 is set.

(1.1) Configuration of the High-Power Base Station

Figure 2:
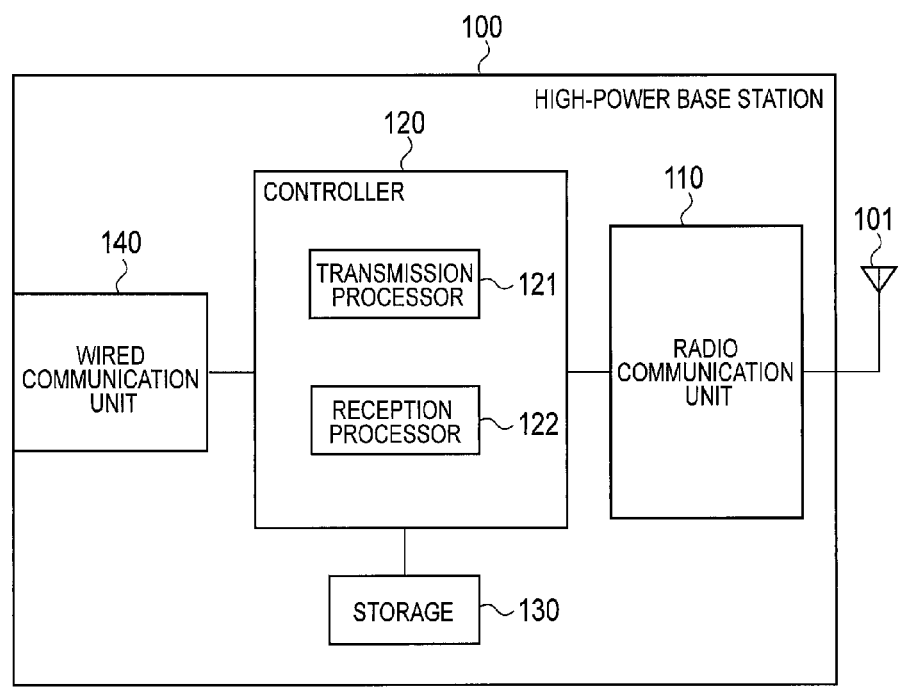
FIG. 2 is a block diagram illustrating a configuration of a high-power base station according to first and third embodiments of the present invention.

FIG. 2 is a functional block diagram illustrating the configuration of the high-power base station 100 in the first embodiment. As illustrated in FIG. 2, the high-power base station 100 has an antenna unit 101, a radio communication unit 110, a controller 120, a storage 130, and a wired communication unit 140.

The radio communication unit 110 is configured using, for example, a radio frequency (RF) circuit and a base band (BB) circuit, and transmits/receives a radio signal via the antenna unit 101. Also, the radio communication unit 110 encodes and modulates a transmission signal and demodulates and decodes a received signal.

The controller 120 is configured using, for example, CPU and controls various kinds of functions included in the high-power base station 100. The storage 130 is configured using, for example, a memory, and stores various kinds of information to be used for control on the high-power base station 100 and the like. The wired communication unit 140 communicates with the low-power base station 200 via the core network 500.

The controller 120 has a transmission processor 121 and a reception processor 122.

The transmission processor 121 performs processing of transmitting control information using a control information channel (PDCCH: Physical Downlink Control CHannel) within a resource block (RB) which is a downlink radio resource. The control information in the PDCCH (PDCCH control information) is transmitted via the radio communication unit 110 and the antenna unit 101.

When a radio terminal 300 to be described later sets the high-power base station 100 as a connection destination candidate, the reception processor 122 performs processing of receiving a connection request from the radio terminal 300 via the antenna unit 101 and the radio communication unit 110. When the connection request from the radio terminal 300 is received, the controller 120 performs processing of connecting the radio terminal 300 in response to the connection request.

(1.2) Configuration of the Low-Power Base Station

Figure 3:
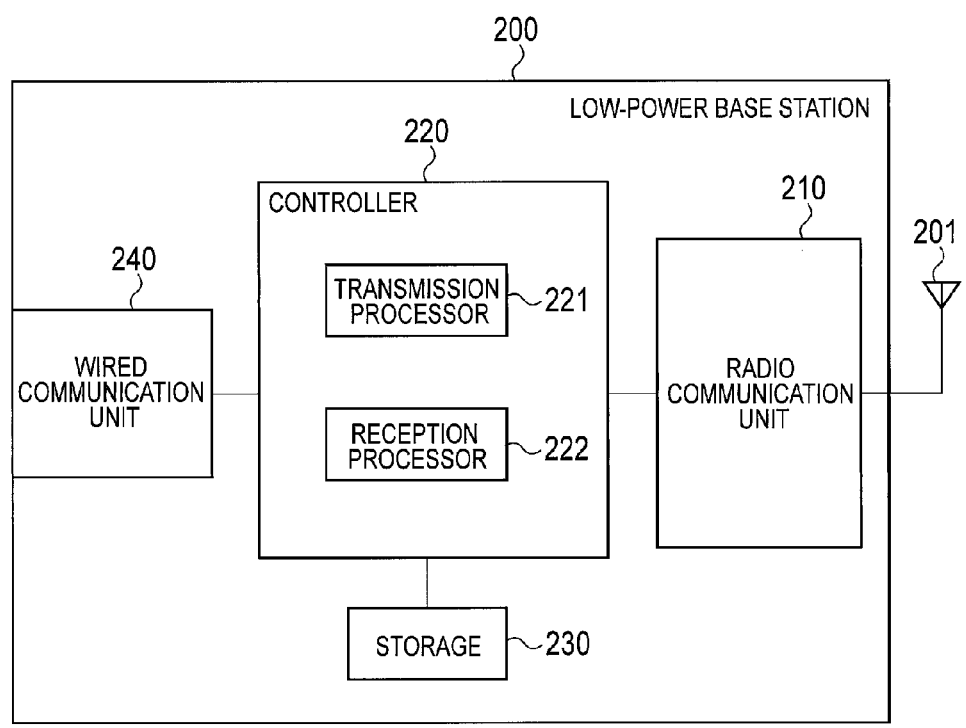
FIG. 3 is a block diagram illustrating a configuration of a low-power base station according to first and second embodiments of the present invention.

FIG. 3 is a functional block diagram illustrating the configuration of the low-power base station 200 in the first embodiment. As illustrated in FIG. 3, the low-power base station 200 has an antenna unit 201, a radio communication unit 210, a controller 220, a storage 230, and a wired communication unit 240.

The radio communication unit 210 is configured using, for example, a radio frequency (RF) circuit and a base band (BB) circuit, and transmits/receives a radio signal via the antenna unit 201. Also, the radio communication unit 210 encodes and modulates a transmission signal and demodulates and decodes a received signal.

The controller 220 is configured using, for example, CPU and controls various kinds of functions included in the low-power base station 200. The storage 230 is configured using, for example, a memory, and stores various kinds of information to be used for control on the low-power base station 200 and the like. The wired communication unit 240 communicates with the high-power base station 100 via the core network 500.

The controller 220 has a transmission processor 221 and a reception processor 222.

The transmission processor 221 performs processing of transmitting control information using a control information channel (PDCCH) within a resource block (RB) which is a downlink radio resource. The control information in the PDCCH (PDCCH control information) is transmitted via the radio communication unit 210 and the antenna unit 201.

When a radio terminal 300 to be described later sets the low-power base station 200 as a connection destination candidate, the reception processor 222 performs processing of receiving a connection request from the radio terminal 300 via the antenna unit 201 and the radio communication unit 210. When the connection request from the radio terminal 300 is received, the controller 220 performs processing of connecting the radio terminal 300 in response to the connection request.

(1.3) Configuration of the Radio Terminal

Figure 4:
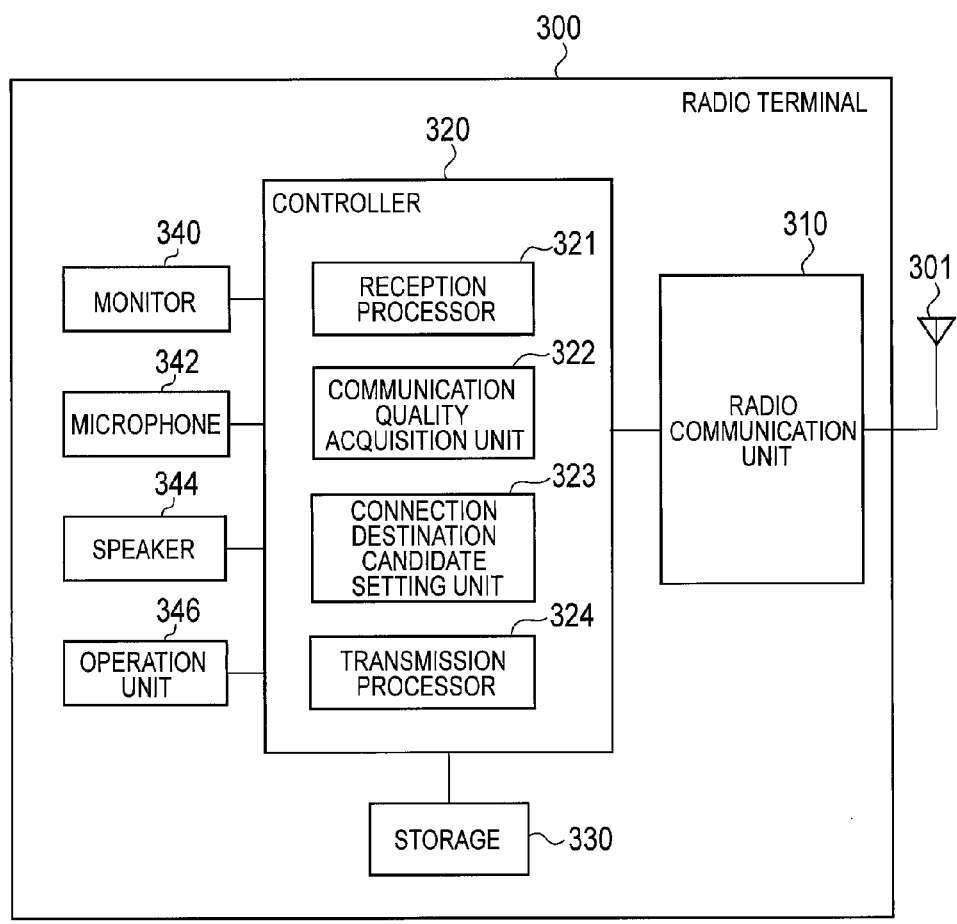
FIG. 4 is a block diagram illustrating a configuration of a radio terminal according to the first embodiment of the present invention.

FIG. 4 is a functional block diagram illustrating the configuration of the radio terminal 300 in the first embodiment. As illustrated in FIG. 4, the radio terminal 300 has an antenna unit 301, a radio communication unit 310, a controller 320, a storage 330, a monitor 340, a microphone 342, a speaker 344, and an operation unit 346.

The radio communication unit 310 is configured using, for example, a radio frequency (RF) circuit and a base band (BB) circuit, and transmits/receives a radio signal via the antenna unit 301. Also, the radio communication unit 310 encodes and modulates a transmission signal and demodulates and decodes a received signal.

The controller 320 is configured using, for example, CPU and controls various kinds of functions included in the radio terminal 300. The storage 330 is configured using, for example, a memory, and stores various kinds of information to be used for control on the radio terminal 300 and the like.

The monitor 340 displays an image received via the controller 320 or displays contents of operation (such as an inputted telephone number and address). The microphone 342 collects sound and outputs sound data based on the collected sound to the controller 320. The speaker 344 outputs sound based on the sound data acquired from the controller 320. The operation unit 346 is configured of a numerical keypad, a function key, and the like, and is an interface used for inputting contents of user operation.

The controller 320 includes a reception processor 321, a communication quality acquisition unit 322, a connection destination candidate setting unit 323, and a transmission processor 324.

The reception processor 321 performs processing of receiving PDCCH control information from the high-power base station 100 and performs processing of receiving PDCCH control information from the low-power base station 200, via the antenna unit 301 and the radio communication unit 310. The reception processor 321 can estimate a cell ID which is identification information of a base station being a transmitter of the PDCCH control information by information within a synchronization channel (SCH) at an initial stage of the connection. Also, the reception processor 321 can acquire information to identify whether the transmitter is a high-power base station or a low-power base station (transmission power identification information) and a utilization rate of PDCCH in the high-power base station 100 by decoding the control information, which is transmitted from the base station using the PDSCH, in the processing on a layer higher than a physical layer or a data link layer.

The communication quality acquisition unit 322 measures received power of the PDCCH control information received by the reception processor 321.

The connection destination candidate setting unit 323 sets any of the high-power base station 100 and the low-power base station 200 as a connection destination candidate based on the received power of each piece of the PDCCH control information.

Specifically, the connection destination candidate setting unit 323 determines if the transmitter of each piece of the PDCCH control information is the high-power base station 100 or the low-power base station 200. Hereinafter, the PDCCH control information whose transmitter is the high-power base station 100 is referred to as high-power PDCCH control information and the PDCCH control information whose transmitter is the low-power base station 200 is referred to as low-power PDCCH control information.

Subsequently, the connection destination candidate setting unit 323 determines if the received power of the low-power PDCCH control information is equal to or higher than a predetermined value. The predetermined value represents received power of the low-power PDCCH control information in the radio terminal 300 in the case where the low-power PDCCH control information transmitted from the low-power base station 200 has an error rate of a certain prescribed value, and is predetermined and stored in the storage 330.

Prior to the determination processing, the connection destination candidate setting unit 323 reads the predetermined value stored in the storage 330. Thereafter, the connection destination candidate setting unit 323 corrects the predetermined value based on the utilization rate of the PDCCH in the high-power base station 100. Here, the connection destination candidate setting unit 323 corrects the predetermined value to be a higher value as the utilization rate of the PDCCH in the high-power base station 100 becomes higher.

After that, the connection destination candidate setting unit 323 determines if the received power of the low-power PDCCH control information is equal to or higher than the predetermined value after the correction. In the present embodiment, the low-power PDCCH control information is transmitted from each of the low-power base stations 200a and 200b. In this case, the connection destination candidate setting unit 323 determines if at least any of the received powers of the low-power PDCCH control information is equal to or higher than the predetermined value after the correction.

When the received power of the low-power PDCCH control information is equal to or higher than the predetermined value after the correction, the connection destination candidate setting unit 323 excludes the high-power base station 100 from the connection destination candidate. In other words, when the received power of the low-power PDCCH control information is equal to or higher than the predetermined value after the correction, the connection destination candidate setting unit 323 sets a low-power base station 200 whose low-power PDCCH control information achieves the highest received power among the low-power base stations 200 as a connection destination candidate regardless of the received power of the high-power PDCCH control information.

On the other hand, when the received power of the low-power PDCCH control information is lower than the predetermined value after the correction, the connection destination candidate setting unit 323 sets, as a connection destination candidate, any of the high-power base station 100 and the low-power base station 200 which is a base station transmitting the PDCCH control information achieving the highest received power among the received PDCCH control information pieces.

The transmission processor 324 performs processing of transmitting a connection request via the radio communication unit 310 and the antenna unit 301 to any of the high-power base station 100 and the low-power base station 200, which is set as a connection destination candidate by the connection destination candidate setting unit 323.

(1.4) Operation of the Radio Communication System

Figure 5:
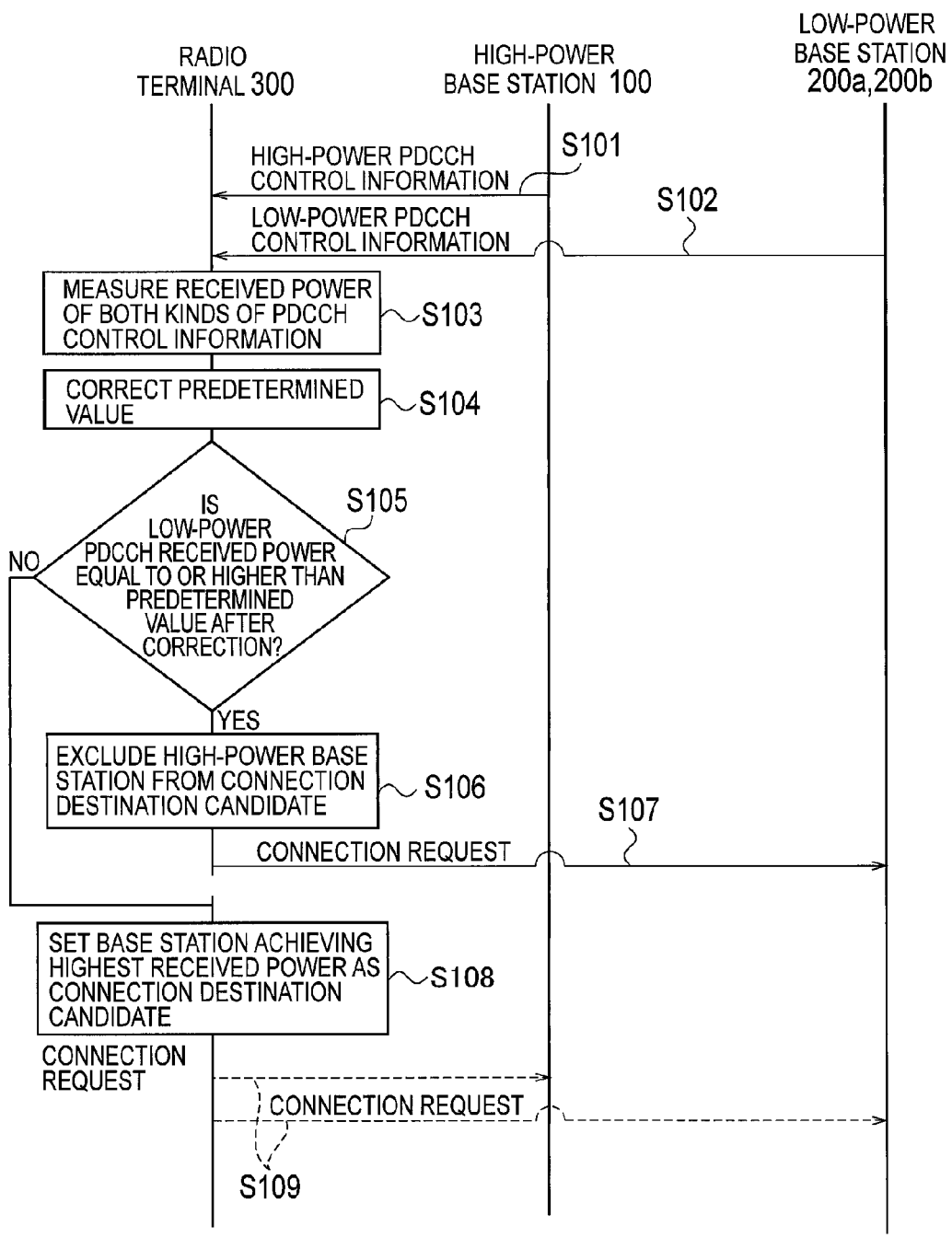
FIG. 5 is a sequence diagram illustrating an operational example of the radio communication system according to the first embodiment of the present invention.

FIG. 5 is a sequence diagram illustrating an operational example of the radio communication system 1 in the first embodiment.

At step S101, the high-power base station 100 transmits high-power PDCCH control information. The radio terminal 300 receives the high-power PDCCH control information. At step S102, the low-power base station 200 transmits low-power PDCCH control information. The radio terminal 300 receives the low-power PDCCH control information.

At step S103, the radio terminal 300 measures received power of the received high-power PDCCH control information and received power of the low-power PDCCH control information.

At step S104, the radio terminal 300 corrects a predetermined value based on a utilization rate of PDCCH in the high-power base station 100 to a higher value as the utilization rate of PDCCH becomes higher.

At step S105, the radio terminal 300 determines if the received power of the low-power PDCCH control information is equal to or higher than the predetermined value after the correction.

When the received power of the low-power PDCCH control information is equal to or higher than the predetermined value after the correction, the radio terminal 300 excludes the high-power base station 100 from the connection destination candidate and sets the low-power base station 200 whose low-power PDCCH control information achieves the highest received power among the low-power base stations 200 as a connection destination candidate at step S106.

At step S107, the radio terminal 300 transmits a connection request to the low-power base station 200 of the connection destination candidate. The low-power base station 200 receives the connection request.

On the other hand, when it is determined at step S105 that the received power of the low-power PDCCH control information is lower than the predetermined value after the correction, the radio terminal 300 sets as a connection destination candidate any of the high-power base station 100 and the low-power base station 200, at step S108, which is a base station transmitting the PDCCH control information achieving the highest received power among the received high-power PDCCH control information and low-power PDCCH control information.

At step S109, the radio terminal 300 transmits the connection request to any of the high-power base station 100 and the low-power base station 200, which is the connection destination candidate. Any of the high-power base station 100 and the low-power base station 200 receives the connection request.

(2) Second Embodiment

Hereinafter, the descriptions are given of configurations of a high-power base station, a low-power base station, and a radio terminal and an operation of a radio communication system in a second embodiment. In the second embodiment, a connection destination of a radio terminal 300 is originally a high-power base station 100, and a connection destination candidate for the radio terminal 300 is set when handover switching from the high-power base station 100 to a low-power base station 200 is conducted.

(2.1) Configuration of the High-Power Base Station

Figure 6:
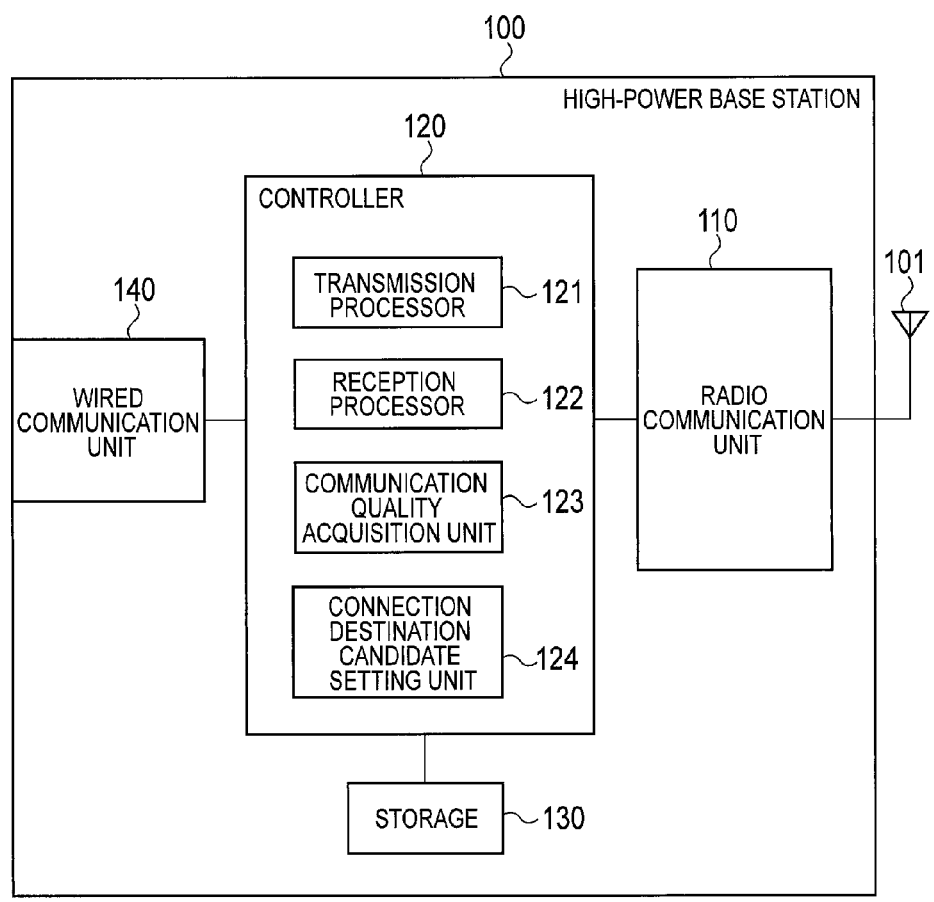
FIG. 6 is a block diagram illustrating a configuration of a high-power base station according to the second embodiment of the present invention.

FIG. 6 is a functional block diagram illustrating the configuration of the high-power base station 100 in the second embodiment. As illustrated in FIG. 6, the high-power base station 100 has an antenna unit 101, a radio communication unit 110, a controller 120, a storage 130, and a wired communication unit 140.

Processing of the antenna unit 101, the radio communication unit 110, the storage 130, and the wired communication unit 140 is same as that of the high-power base station 100 in the first embodiment illustrated in FIG. 2, and the description thereof is omitted.

The controller 120 is configured using, for example, CPU and controls various kinds of functions included in the high-power base station 100. The controller 120 has a transmission processor 121, a reception processor 122, a communication quality acquisition unit 123, and a connection destination candidate setting unit 124.

The transmission processor 121 performs processing of transmitting high-power PDCCH control information using PDCCH. The high-power PDCCH control information is transmitted via the radio communication unit 110 and the antenna unit 101.

The reception processor 122 performs processing of receiving various kinds of information from the radio terminal 300 via the antenna unit 101 and the radio communication unit 110.

The communication quality acquisition unit 123 acquires received power of high-power PDCCH control information and received power of low-power PDCCH control information, both of which are measured in the radio terminal, among the various kinds of the information received by the reception processor 122. Here, the received power of the high-power PDCCH control information and the received power of the low-power PDCCH control information respectively include base station IDs of the corresponding base stations.

The connection destination candidate setting unit 124 sets any of the high-power base station 100 and the low-power base station 200 based on the received power of the high-power PDCCH control information and the received power of the low-power PDCCH control information.

Specifically, the connection destination candidate setting unit 124 performs processing substantially same as that of the connection destination candidate setting unit 323 in the controller 320 of the radio terminal 300 in the first embodiment. In other words, the connection destination candidate setting unit 124 determines whether a transmitter of each piece of the PDCCH control information is the high-power base station 100 or the low-power base station 200.

Subsequently, the connection destination candidate setting unit 124 determines if the received power of the low-power PDCCH control information is equal to or higher than a predetermined value. The predetermined value represents received power of the low-power PDCCH control information in the ratio terminal 300 in the case where the low-power PDCCH control information transmitted from the low-power base station 200 has an error rate of a certain prescribed value, and is predetermined and stored in the storage 130.

Prior to the determination processing, the connection destination candidate setting unit 124 reads the predetermined value stored in the storage 130. Subsequently, the connection destination candidate setting unit 124 acquires a utilization rate of PDCCH in the high-power base station 100 and performs correction so that the predetermined value would be higher as the utilization rate of PDCCH in the high-power base station 100 is higher.

After that, the connection destination candidate setting unit 124 determines if the received power of the low-power PDCCH control information is equal to or higher than the predetermined value after the correction. In the present embodiment, the low-power PDCCH control information is transmitted from each of the low-power base station 200a and the low-power base station 200b to the radio terminal 300, and the received power thereof is measured. In this case, the connection destination candidate setting unit 124 determines if at least any received power of the low-power PDCCH control information is equal to or higher than the predetermined value after the correction.

When the received power of the low-power PDCCH control information is equal to or higher than the predetermined value after the correction, the connection destination candidate setting unit 124 excludes the high-power base station 100 from the connection destination candidate. In other words, when the received power of the low-power PDCCH control information is equal to or higher than the predetermined value after the correction, the connection destination candidate setting unit 124 sets, as a connection destination candidate, a low-power base station 200 whose low-power PDCCH control information achieves the highest received power among the low-power base stations 200, regardless of the received power of the high-power PDCCH control information.

On the other hand, when the received power of the low-power PDCCH control information is lower than the predetermined value after the correction, the connection destination candidate setting unit 124 sets any of the high-power base station 100 and the low-power base station 200, which is a transmitter base station of the PDCCH control information with the highest received power as a connection destination candidate.

When the low-power base station 200 is set as the connection destination candidate by the connection destination candidate setting unit 124, the transmission processor 125 transmits a handover request, which is a request to connect the radio terminal 300, to the low-power base station 200 via the wired communication unit 140. A transmission destination of the handover request is determined based on the base station ID for the low-power base station 200 as the connection destination candidate. Furthermore, the transmission processor 125 transmits a handover command to the radio terminal 300 via the radio communication unit 110 and the antenna unit 101. The handover command is a command to switch the connection destination from the high-power base station 100 to the low-power base station 200 as the connection destination candidate.

On the other hand, when the high-power base station 100 is set as a connection destination candidate by the connection destination candidate setting unit 124, the processing relating to the handover is not performed, and the radio terminal 300 remains connected to the high-power base station 100.

(2.2) Configuration of the Low-Power Base Station

The configuration of the low-power base station 200 is same as the configuration of the low-power base station in the first embodiment illustrated in FIG. 3, and the description thereof is omitted.

(2.3) Configuration of the Radio Terminal

Figure 7:
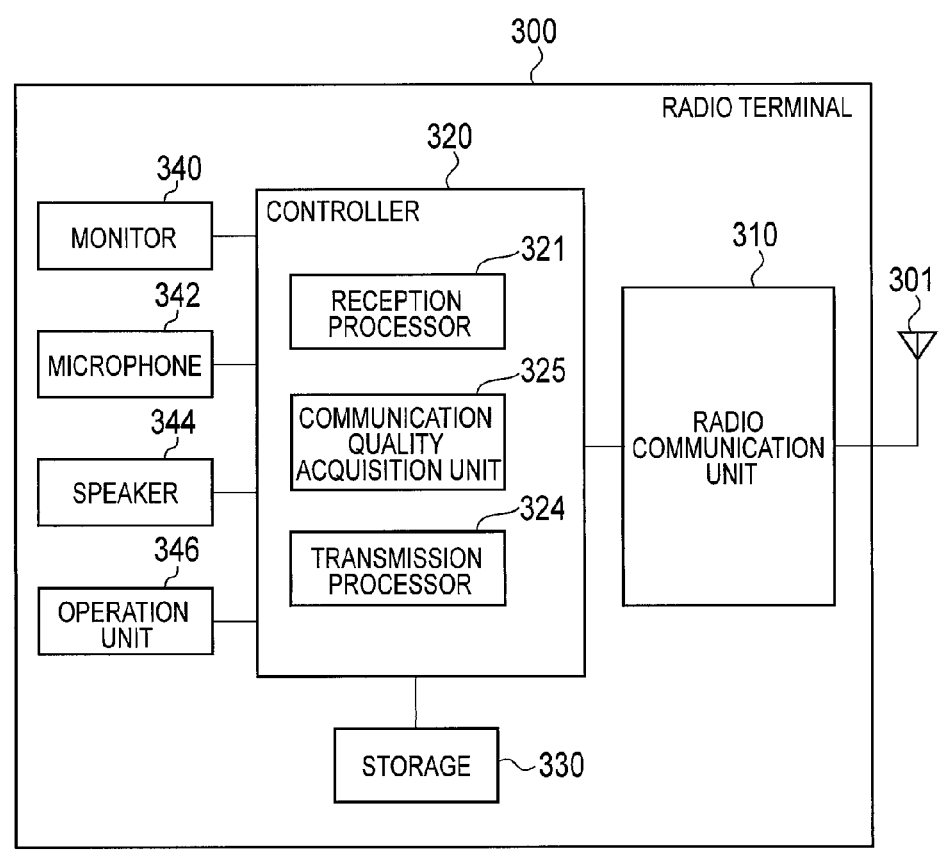
FIG. 7 is a block diagram illustrating a configuration of a radio terminal according to the second and third embodiments of the present invention.

FIG. 7 is a functional block diagram illustrating the configuration of the radio terminal 300 in the second embodiment. As illustrated in FIG. 7, the radio terminal 300 has an antenna unit 301, a radio communication unit 310, a controller 320, a storage 330, a monitor 340, a microphone 342, a speaker 344, and an operation unit 346.

Processing of the antenna unit 301, the radio communication unit 310, the storage 330, the monitor 340, the microphone 342, the speaker 344, and the operation unit 346 is same as that of the radio terminal 300 in the first embodiment illustrated in FIG. 4, and the description thereof is omitted.

The controller 320 is configured using, for example, CPU and controls various kinds of functions included in the radio terminal 300. The controller 320 includes a reception processor 321, a communication quality acquisition unit 322, and a transmission processor 324.

The reception processor 321 performs processing of receiving high-power PDCCH control information from the high-power base station 100 and performs processing of receiving low-power PDCCH control information from the low-power base station 200, via the antenna unit 301 and the radio communication unit 310.

The communication quality acquisition unit 322 measures the received power of the high-power PDCCH control information and the received power of the low-power PDCCH control information.

The transmission processor 324 performs processing of transmitting the received power of the high-power PDCCH control information and the received power of the low-power PDCCH control information to the high-power base station 100 to which the radio terminal 300 is connected via the radio communication unit 310 and the antenna unit 301. As described above, the received power of the high-power PDCCH control information and the received power of the low-power PDCCH control information respectively include base station IDs of the corresponding base stations.

(2.4) Operation of the Radio Communication System

FIG. 8 is a sequence diagram illustrating an operational example of the radio communication system 1 in the second embodiment.

At step S201, the high-power base station 100 transmits high-power PDCCH control information. The radio terminal 300 receives the high-power PDCCH control information. At step S202, the low-power base station 200 transmits low-power PDCCH control information. The radio terminal 300 receives the low-power PDCCH control information.

At step S203, the radio terminal 300 measures received power of the received high-power PDCCH control information and received power of the received low-power PDCCH control information.

At step S204, the radio terminal 300 transmits the received power of the high-power PDCCH control information and the received power of the low-power PDCCH control information to the high-power base station 100. The high-power base station 100 receives the received power of the high-power PDCCH control information and the received power of the low-power PDCCH control information.

At step S205, the high-power base station 100 performs correction so that a predetermined value would be higher as a utilization rate of PDCCH in the high-power base station 100 is higher.

At step S206, the high-power base station 100 determines if the received power of the low-power PDCCH control information is equal to or higher than the predetermined value after the correction.

When the received power of the low-power PDCCH control information is equal to or higher than the predetermined value after the correction, the high-power base station 100 excludes the high-power base station 100 from the connection destination candidate, and sets, as a connection destination candidate, a low-power base station 200 whose low-power PDCCH control information achieves the highest received power, among the low-power base stations 200 at step S207.

At step S208, the high-power base station 100 transmits a handover request to the low-power base station 200 being the connection destination candidate. The low-power base station 200 receives the handover request. Thereafter, the low-power base station 200 performs processing relating to the handover switching the connection destination of the radio terminal 300 from the high-power base station 100 to the low-power base station 200.

Furthermore, at step S209, the high-power base station 100 makes a handover command to the radio terminal 300. The radio terminal 300 receives the handover command. Thereafter, the radio terminal 300 performs processing relating to the handover switching the connection destination of the radio terminal 300 from the high-power base station 100 to the low-power base station 200.

On the other hand, when it is determined at step S206 that the received power of the low-power PDCCH control information is lower than the predetermined value after the correction, the high-power base station 100 sets, as a connection destination candidate, any of the high-power base station 100 and the low-power base station 200 that is a base station transmitting the PDCCH control information achieving the highest received power, at step S210.

When the connection destination candidate is the low-power base station 200, the high-power base station 100 transmits a handover request to the low-power base station 200 being the connection destination candidate at step S211. The low-power base station 200 receives the handover request. Thereafter, the low-power base station 200 performs processing relating to the handover switching the connection destination of the radio terminal 300 from the high-power base station 100 to the low-power base station 200.

Furthermore, at step S212, the high-power base station 100 makes a handover command to the radio terminal 300. The radio terminal 300 receives the handover command. Thereafter, the radio terminal 300 performs processing relating to the handover switching the connection destination of the radio terminal 300 from the high-power base station 100 to the low-power base station 200.

(3) Third Embodiment

Hereinafter, the descriptions are given of configurations of a high-power base station, a low-power base station, and a radio terminal and an operation of a radio communication system in a third embodiment. In the third embodiment, a connection destination of a radio terminal 300 is originally a low-power base station 200, and a connection destination candidate for the radio terminal 300 is set when handover switching from the low-power base station 200 to a high-power base station 100 or another low-power base station 200 is conducted.

(3.1) Configuration of the High-Power Base Station

The configuration of the high-power base station 100 is same as the configuration of the high-power base station 100 in the first embodiment illustrated in FIG. 2, and the description thereof is omitted.

(3.2) Configuration of the Low-Power Base Station

FIG. 9 is a functional block diagram illustrating the configuration of the low-power base station 200 in the third embodiment. As illustrated in FIG. 9, the low-power base station 200 has an antenna unit 201, a radio communication unit 210, a controller 220, a storage 230, and a wired communication unit 240.

Processing of the antenna unit 201, the radio communication unit 210, the storage 230, and the wired communication unit 240 is same as that of the low-power base station 200 in the first embodiment illustrated in FIG. 3, and the description thereof is omitted.

The controller 220 is configured using, for example, CPU and controls various kinds of functions included in the low-power base station 200. The controller 220 has a transmission processor 221, a reception processor 222, a communication quality acquisition unit 223, and a connection destination candidate setting unit 224.

The transmission processor 221 performs processing of transmitting low-power PDCCH control information using PDCCH. The low-power PDCCH control information is transmitted via the radio communication unit 210 and the antenna unit 201.

The reception processor 222 performs processing of receiving various kinds of information from the radio terminal 300 via the antenna unit 201 and the radio communication unit 210.

The communication quality acquisition unit 223 acquires received power of the high-power PDCCH control information and received power of the low-power PDCCH control information, both of which are measured in the radio terminal, among the various kinds of the information received by the reception processor 222. Here, the received power of the high-power PDCCH control information and the received power of the low-power PDCCH control information respectively include base station IDs of the corresponding base stations.

The connection destination candidate setting unit 224 sets any one of the high-power base station 100 and the low-power base station 200 based on the received power of the high-power PDCCH control information and the received power of the low-power PDCCH control information.

Specifically, the connection destination candidate setting unit 224 performs processing substantially same as that of the connection destination candidate setting unit 323 in the controller 320 of the radio terminal 300 in the first embodiment. In other words, the connection destination candidate setting unit 224 determines whether a transmitter of each piece of the PDCCH control information is the high-power base station 100 or the low-power base station 200.

Subsequently, the connection destination candidate setting unit 224 determines if the received power of the low-power PDCCH control information is equal to or higher than a predetermined value. The predetermined value is received power of the low-power PDCCH control information in the radio terminal 300 in a case where the low-power PDCCH control information transmitted from the low-power base station 200 has an error rate of a certain prescribed value (for example, 1%), and is predetermined and stored in the storage 230.

Prior to the determination processing, the connection destination candidate setting unit 224 reads the predetermined value stored in the storage 230. Subsequently, the connection destination candidate setting unit 224 performs correction so that the predetermined value would be higher as the utilization rate is higher based on the utilization rate of the PDCCH in the high-power base station 100.

After that, the connection destination candidate setting unit 224 determines if the received power of the low-power PDCCH control information is equal to or higher than the predetermined value after the correction. In the present embodiment, the low-power PDCCH control information is transmitted from each of the low-power base station 200a and the low-power base station 200b to the radio terminal 300, and the received power thereof is measured. In this case, the connection destination candidate setting unit 224 determines if at least any of the received powers of the low-power PDCCH control information is equal to or higher than the predetermined value after the correction.

When the received power of the low-power PDCCH control information is equal to or higher than the predetermined value after the correction, the connection destination candidate setting unit 224 excludes the high-power base station 100 from the connection destination candidate. In other words, when the received power of the low-power PDCCH control information is equal to or higher than the predetermined value after the correction, the connection destination candidate setting unit 224 sets, as a connection destination candidate, a low-power base station 200 whose low-power PDCCH control information achieves the highest received power among the low-power base stations 200, regardless of the received power of the high-power PDCCH control information.

On the other hand, when the received power of the low-power PDCCH control information is lower than the predetermined value after the correction, the connection destination candidate setting unit 224 sets, as a connection destination candidate, any of the high-power base station 100 and the low-power base station 200 that is a base station transmitting the PDCCH control information achieving the highest received power.

When any of the high-power base station 100 and another low-power base station 200 other than the own low-power base station 200 is set as a connection destination candidate by the connection destination candidate setting unit 224, the transmission processor 225 transmits a handover request to the any of the high-power base station 100 and the other low-power base station 200 via the wired communication unit 240. The handover request is a request to connect the radio terminal 300. A transmission destination of the handover request is determined based on the base station ID for the high-power base station 100 or the low-power base station 200 as the connection destination candidate. Furthermore, the transmission processor 225 transmits a handover command to the radio terminal 300 via the radio communication unit 210 and the antenna unit 201. The handover command is a command to switch the connection destination from the low-power base station 200 to the high-power base station 100 and the other low-power base station 200 as the connection destination candidate.

On the other hand, when the own low-power base station 200 is set as a connection destination candidate by the connection destination candidate setting unit 224, the processing relating to the handover is not performed, and the radio terminal 300 remains connected to the own low-power base station 200.

(3.3) Configuration of the Radio Terminal

The configuration of the radio terminal 300 is same as the configuration of the radio terminal 300 in the second embodiment illustrated in FIG. 7, and the description thereof is omitted.

(3.4) Operation of the Radio Communication System

FIG. 10 is a sequence diagram illustrating an operational example of the radio communication system 1 in the third embodiment. Note that it is assumed in the following description that the radio terminal 300 is originally connected to a low-power base station 200*a* of low-power base stations 200*a* and 200*b*.

At step S301, the high-power base station 100 transmits high-power PDCCH control information. The radio terminal 300 receives the high-power PDCCH control information. At step S302, the low-power base station 200 transmits low-power PDCCH control information. The radio terminal 300 receives the low-power PDCCH control information.

At step S303, the radio terminal 300 measures received power of the received high-power PDCCH control information and received power of low-power PDCCH control information.

At step S304, the radio terminal 300 transmits the received power of the high-power PDCCH control information and the received power of the low-power PDCCH control information to the low-power base station 200*a*. The low-power base station 200*a* receives the received power of the high-power PDCCH control information and the received power of the low-power PDCCH control information.

At step S305, the high-power base station 200*a* performs correction so that a predetermined value would be higher as a utilization rate of PDCCH in the high-power base station 100 is higher.

At step S306, the low-power base station 200*a* determines if the received power of the low-power PDCCH control information is equal to or higher than the predetermined value after the correction.

When the received power of the low-power PDCCH control information is equal to or higher than the predetermined value after the correction, the low-power base station 200*a* excludes the high-power base station 100 from the connection destination candidate and sets, as a connection destination candidate, a low-power base station 200 whose low-power PDCCH control information achieves the highest received power, among the low-power base stations 200*a* and 200*b*, at step S307.

When the connection destination candidate is the low-power base station 200*b*, the low-power base station 200*a* transmits a handover request to the low-power base station 200*b* being the connection destination candidate at step S308. The low-power base station 200*b* receives the handover request. Thereafter, the low-power base station 200*b* performs processing relating to the handover switching the connection destination of the radio terminal 300 from the low-power base station 200*a* to the low-power base station 200*b*.

Furthermore, at step S309, the low-power base station 200*a* makes a handover command to the radio terminal 300. The radio terminal 300 receives the handover command. Thereafter, the radio terminal 300 performs processing relating to the handover switching the connection destination of the radio terminal 300 from the low-power base station 200*a* to the low-power base station 200*b*.

On the other hand, when it is determined at step S306 that the received power of the low-power PDCCH control information is lower than the predetermined value after the correction, the low-power base station 200*a* sets, as a connection destination candidate, any of the high-power base station 100 and the low-power base stations 200*a* and 200*b* that is a base station transmitting the PDCCH control information achieving the highest received power, at step S310.

When the connection destination candidate is the low-power base station 200*b*, the low-power base station 200*a* transmits a handover request to the low-power base station 200*b* being the connection destination candidate at step S311. The low-power base station 200*b* receives the handover request. Thereafter, the low-power base station 200*b* performs processing relating to the handover switching the connection destination of the radio terminal 300 from the low-power base station 200*a* to the low-power base station 200*b*.

In addition, when the connection destination candidate is the high-power base station 100, the low-power base station 200*a* transmits a handover request to the high-power base station 100 being the connection destination candidate at step S311. The high-power base station 100 receives the handover request. Thereafter, the high-power base station 100 performs processing relating to the handover switching the connection destination of the radio terminal 300 from the low-power base station 200*a* to the high-power base station 100.

Furthermore, at step S312, the low-power base station 200*a* makes a handover command to the radio terminal 300. The radio terminal 300 receives the handover command. Thereafter, the radio terminal 300 performs processing relating to the handover switching the connection destination of the radio terminal 300 from the low-power base station 200*a* to the low-power base station 200*b* or the high-power base station 100.

(4) Advantageous Effects

In the radio communication system 1 in the first embodiment, when the received power of the low-power PDCCH control information from the low-power base station 200 is equal to or higher than the predetermined value, the radio terminal 300 excludes the high-power base station 100 from the connection destination candidate for the radio terminal 300 regardless of the received power of the high-power PDCCH control information from the high-power base station 100.

Also, in the radio communication system 1 in the second embodiment, when the received power of the low-power PDCCH control information from the low-power base station 200 in the radio terminal 300 is equal to or higher than the predetermined value, the high-power base station 100 excludes the high-power base station 100 from the connection destination candidate for the radio terminal 300 regardless of the received power of the high-power PDCCH control information from the high-power base station 100.

Also, in the radio communication system 1 in the third embodiment, when the received power of the low-power PDCCH control information from the low-power base station 200 in the radio terminal 300 is equal to or higher than the predetermined value, the low-power base station 200 excludes the high-power base station 100 from the connection destination candidate for the radio terminal 300 regardless of the received power of the high-power PDCCH control information from the high-power base station 100.

Accordingly, when the received power of the low-power PDCCH control information is equal to or higher than the predetermined value, the radio terminal 300 comes to be connected to the low-power base station 200, which practically enlarges a communication area (coverage area) of the low-power base station 200 as compared with the conventional case. This enables proper distribution of the load of the high-power base station 100. Also, even when the radio terminal 300 is connected to the low-power base station 200, the quality of the PDCCH is maintained. Since the control information transmitted using the PDCCH includes PDSCH assignment information, PUSCH assignment information, and the like, maintaining the quality of the PDCCH can improve not only the downlink characteristic but also the uplink characteristic.

Also, the predetermined value is the received power in the radio terminal 300 in the case where the low-power PDCCH control information from the low-power base station 200 has the error rate of the prescribed value. Accordingly, even when the low-power base station 200 becomes a connection destination of the radio terminal 300, the error rate of the low-power PDCCH control information can be maintained at the prescribed value or below.

Furthermore, the predetermined value is a value which becomes larger as the utilization rate of PDCCH in the high-power base station 100 becomes higher. A higher utilization rate of PDCCH in the high-power base station 100 increases a probability that the radio terminal 300 may receive interference from the high-power base station 100 when being connected to the low-power base station 200. Accordingly, setting the predetermined value to a larger value for a higher utilization rate of the PDCCH in the high-power base station 100 can lower a probability that the low-power base station 200 may be a connection destination candidate for the radio terminal 300, and also lower a probability that the radio terminal 300 may receive the interference from the high-power base station 100, as the utilization rate of the PDCCH in the high-power base station 100 becomes higher.

(5) Other Embodiments

As described above, the present invention has been described by using the above-described embodiments. However, it should not be understood that the description and the drawings, which constitute one part of this disclosure, are to limit the present invention. Various alternative embodiments, examples, and operational techniques will be obvious for those who are in the art from this disclosure.

Although the received power of the high-power PDCCH control information and the received power of the low-power PDCCH control information in the radio terminal 300 are used as the communication qualities between the radio terminal 300 and the high-power base station 100 and between the radio terminal 300 and the low-power base station 200 in the above-described embodiments, received power of another signal from the high-power base station 100 or the low-power base station 200 in the radio terminal 300 may be used as a communication quality between the radio terminal 300 and the high-power base station 100 or the low-power base station 200. Also, SINRs of signals from the high-power base station 100 and the low-power base station 200 in the radio terminal 300 may be used as communication qualities between the radio terminal 300 and the high-power base station 100 and between the radio terminal 300 and the low-power base station 200.

Also, although in the above-described embodiments, the description is given of the case where the high-power base station 100 is a macrocell base station forming a macrocell and the low-power base station 200 is a picocell base station forming a picocell, the high-power base station 100 and the low-power base station 200 are not limited to these base stations, and are only needed to have a relationship in which a transmission power of the low-power base station 200 becomes lower than a transmission power of the high-power base station 100. For example, when the high-power base station 100 is a macrocell base station forming a macrocell, the low-power base station 200 can be a microcell base station forming a microcell or a femtocell base station forming a femtocell. Also, when the high-power base station 100 is a microcell base station forming a microcell, the low-power base station 200 can be a femtocell base station forming a femtocell. Furthermore, when the high-power base station 100 is a picocell base station forming a picocell, the low-power base station 200 can be a femtocell base station forming a femtocell.

Also, in the above-described embodiments, the radio communication system 1 has the configuration based on the LTE Release 9 or the LTE-Advanced, but may have the configuration based on other communication standards.

As described above, it should be understood that the present invention includes various embodiments not described herein. Accordingly, the present invention is only limited by the scope of claims and matters specifying the invention, which are appropriate from this disclosure.

Note that the contents of Japan Patent Application No. 2009-251668 (filed on Nov. 2, 2009) are hereby incorporated by reference in their entirety.

INDUSTRIAL APPLICABILITY

A radio communication system, a high-power base station, a low-power base station, a radio terminal, and a radio communication method according to the present invention can properly distribute the load of a high-power base station and are useful as a radio communication system and the like.

The invention claimed is:

1. A radio communication system comprising:
a high-power base station;
a low-power base station whose transmission power is lower than a transmission power of the high-power base station; and
a radio terminal located within a communication area formed by the high-power base station,
wherein the radio communication system comprises a connection destination candidate setting unit configured to exclude the high-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

2. The radio communication system according to claim 1, wherein the connection destination candidate setting unit sets any of the high-power base station and the low-power base station having the highest communication quality as a connection destination candidate when the communication quality between the radio terminal and the low-power base station is below the predetermined value.

3. The radio communication system according to claim 1, wherein the predetermined value is a communication quality allowing control information transmitted from the low-power base station to the radio terminal to have an error rate of a prescribed value.

4. A high-power base station in a radio communication system having the high-power base station, a low-power base station whose transmission power is lower than a transmission power of the high-power base station, and a radio terminal located within a communication area formed by the high-power base station, the high-power base station comprising:
a connection destination candidate setting unit configured to exclude the high-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

5. A low-power base station in a radio communication system having a high-power base station, the low-power base station whose transmission power is lower than a transmission power of the high-power base station, and a radio terminal located within a communication area formed by the high-power base station, the low-power base station comprising:
a connection destination candidate setting unit configured to exclude the high-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

6. A radio terminal in a radio communication system having a high-power base station, a low-power base station whose transmission power is lower than a transmission power of the high-power base station, and the radio terminal located within a communication area formed by the high-power base station, the radio terminal comprising:
a connection destination candidate setting unit configured to exclude the high-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

7. A radio communication method in a radio communication system having a high-power base station, a low-power base station whose transmission power is lower than a transmission power of the high-power base station, and a radio terminal located within a communication area formed by the high-power base station, the method comprising the step of:
excluding the high-power base station by the high-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

8. A radio communication method in a radio communication system having a high-power base station, a low-power base station whose transmission power is lower than a transmission power of the high-power base station, and a radio located within a communication area formed by the high-power base station, the radio communication method comprising the step of:
excluding the high-power base station by the low-power base station from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

9. A radio communication method in a radio communication system having a high-power base station, a low-power base station whose transmission power is lower than a transmission power of the high-power base station, and a radio terminal located within a communication area formed by the high-power base station, the radio communication method comprising the step of:
excluding the high-power base station by the radio terminal from a connection destination candidate for the radio terminal when a communication quality between the radio terminal and the low-power base station is equal to or higher than a predetermined value, wherein the predetermined value is a value which becomes higher as a utilization rate of a radio resource for control information in the high-power base station becomes higher.

* * * * *